United States Patent [19]
McDonald

[11] Patent Number: 4,965,827
[45] Date of Patent: Oct. 23, 1990

[54] AUTHENTICATOR

[75] Inventor: Neil A. McDonald, Witham, United Kingdom

[73] Assignee: The General Electric Company, p.l.c., London, United Kingdom

[21] Appl. No.: 195,323

[22] Filed: May 18, 1988

[30] Foreign Application Priority Data

May 19, 1987 [GB] United Kingdom ............... 8711743

[51] Int. Cl.$^5$ ............................................ H04L 9/00
[52] U.S. Cl. .................................... 380/25; 380/23; 380/24; 380/29; 380/30; 380/46; 380/36; 380/37
[58] Field of Search ................... 380/23, 24, 25, 29, 380/30, 46, 36, 37

[56] References Cited

U.S. PATENT DOCUMENTS

| | | | |
|---|---|---|---|
| 3,798,359 | 3/1974 | Feistel | 380/23 |
| 3,970,790 | 7/1976 | Guanella | 380/23 |
| 4,004,089 | 1/1977 | Richard et al. | 380/23 |
| 4,443,660 | 4/1984 | DeLong | 380/23 |
| 4,688,250 | 8/1987 | Corrington et al. | 380/23 |
| 4,776,011 | 10/1988 | Busby | 380/28 |

Primary Examiner—Thomas H. Tarcza
Assistant Examiner—David Cain
Attorney, Agent, or Firm—Spencer & Frank

[57] ABSTRACT

An authenticator for digital data is derived by generating a numerical array, using a secret key to controllably shift the relative positions of the elements of the array, and applying the scrambled array to a message to create an authenticator for that message. The method allows a high level of security and minimizes the risk of a system, such as an intelligent portable token and reader system, being compromised.

12 Claims, 4 Drawing Sheets

```
A = n
P = 0
FOR i = 0 TO 7      } INITIALISE WORKING REGISTER W(i)
    W(i) = S[i]                                      P
NEXT                                                 A

FOR  i = 1 TO n
     A = S [(W(P) + _{256} M_{n+1-i}) + _{256} A]
     W(P) = A
     P = P + 1 + C_1 + C_2   (mod 8)
     A = S[W(P) + _{256} A]
     W(P) = A
     P = P + 1 + C_1   (mod 8)

FOR  j = 0 TO 1
     A = S [(W(P) + _2 Mi) + _{256} A]
     W(P) = A
     P = P + 1   (mod 8)
     A = S[W(P) + _{256} A]
     W(P) = A
     P = P + 1   (mod 8)
     A = S[(W(P) + _{256} M_{n+1-i}) + _2 A]
     W(P) = A
     P = P + 1   (mod 8)
     A = S [W(P) + _2 A]
     W(P) = A
     P = P + 1   (mod 8)
```

FIG. 1.

NEXT $$A = S\,[(W(P) +_{256} M_i) +_{256} A\,]$$
$$W(P) = A$$
$$P = P + 1 + C_1 + C_2 \quad (\text{mod } 8)$$
$$A = S\,[W(P) +_{256} A\,]$$
$$W(P) = A$$
$$P = P + 1 + C_1 \quad (\text{mod } 8)$$

NEXT

FIG. 1.
(CONT)

AUTHENTICATOR

BACKGROUND TO THE INVENTION

This invention relates to an authenticator of the type which is used to check that a message received at one end of a system has not been corrupted or changed during transmission of the message and also to verify the senders authority to transmit the message.

The authenticator may be applied to electronic transaction systems in which a user inserts a portable electronic token into a terminal which is connected to a central computer and in which messages concerning for instance the users bank account are transferred between the token and computer.

Typically, an authenticator is a one way algorithm A which can transform a message M to produce an authenticator code A(M). The authenticator code A(M) is generally small in size compared with the message M it was derived from and is analogous to a signature since it derives a code which is unique for each different message and cannot be forged without knowledge of the secret one-way function which was used to produce it. It is a one way algorithm since the message itself cannot be derived from the authenticator. When the message has been produced and an authenticator code calculated, the authenticator code is added to the message before it is sent to a receiver. The receiver thus receives both the message and the appended authenticator code. He passes the message through the same authenticator to produce his own authenticator code for the message. The two authenticator codes are then compared and if they are identical the receiver can be reasonably sure that the message received has not been altered since leaving the sender. An authenticator thus ensures firstly that a message has not been altered during transmission and secondly that the sender is verified to use the system since he possesses the same authenticator as the receiver.

An authenticator can be further modified by using a secret key system to select a particular way of implementing the authenticator algorithm. With the secret key K an authenticator is produced A(K,M) which is a function of both the authenticator and the secret key. Thus, even if the basic authenticator algorithm is known the secret keys can be witheld from public knowledge and the system remains secure. The keys can be varied at will, perhaps in a desired selected manner or maybe varied if one key has become compromised. Both sender and receiver must have the same secret key and authenticator for the receiver to be able to check the authenticator sent.

However, the number of different secret keys which can be used with an authenticator is limited by the size of the system and in an 8 byte key system a diligent cavesdropper could work through every possible secret key while attempting to break into the system. The present invention provides an improved system with a greater level of security.

SUMMARY OF THE INVENTION

According to the present invention there is provided a method for authenticating digital data comprising generating a numerical array; using a secret key to controllably shift the relative positions of each element within the array and applying the scambled array to a message to provide an authentication code for that message.

The array may be applied in any suitable manner to the message.

The method and apparatus for generating the authenticator is particularly useful for an electronic token system of the 'smart card' type as described in the applicants co-pending application No. G.B.2173623A which shows an inductively coupled system having memory storage capability and 8 bit microcontroller therein, in which for most uses it is essential that the sender and receiver of a message are clearly identified and authenticated as authorised, and in which the message must be accurate at both the transmission and reception stages.

An embodiment of an authenticator according to the invention is now described by way of example only with reference to the accompanying drawings in which:

BRIEF DESCRIPTION OF THE DRAWINGS

FIG. 1 shows an authentication algorithm.

DETAILED DESCRIPTION OF A PREFERRED EMBODIMENT OF THE INVENTION

Figure 2:
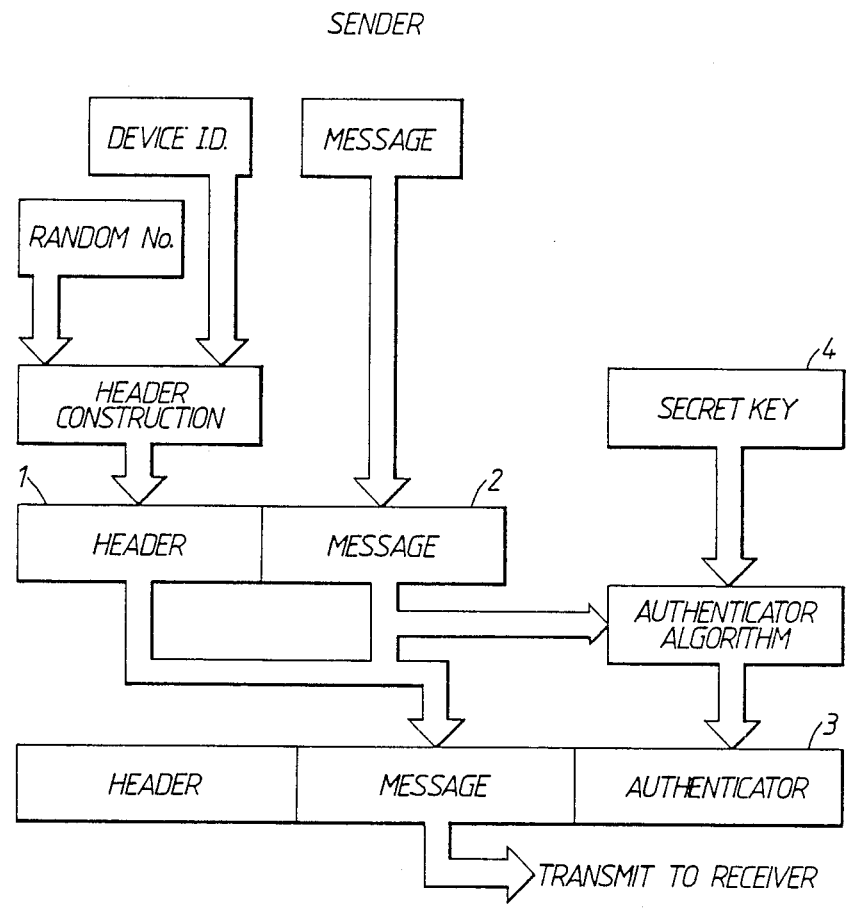
FIGS. 2 and 3 show a validation process.
Figure 3:
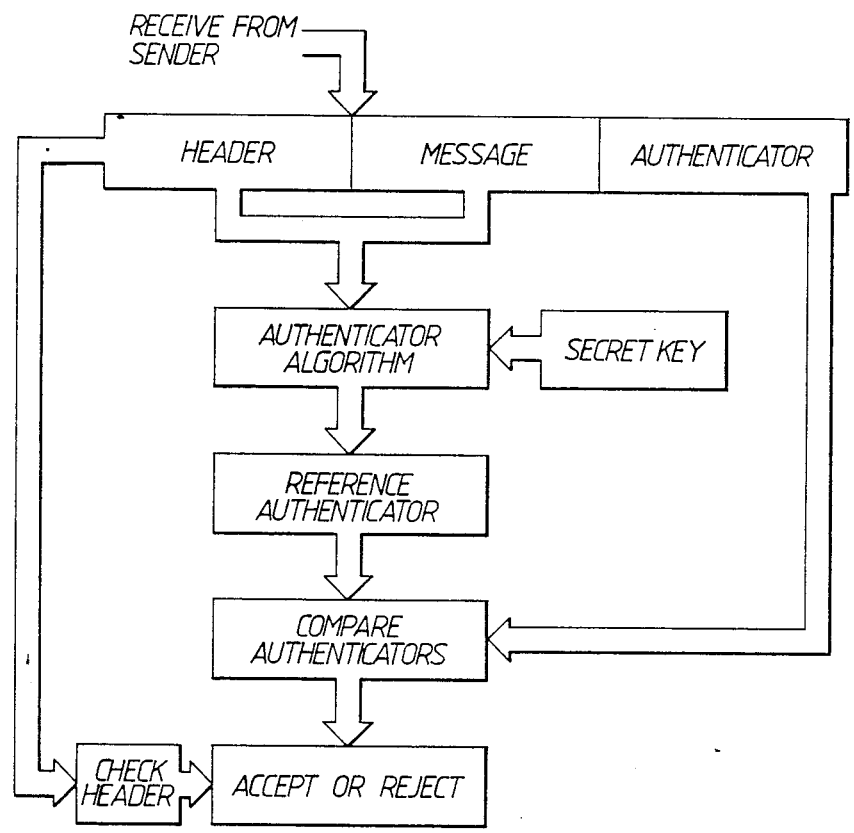

An authenticator algorithm according to the invention is in two stages; an initialisation stage and a general working stage.

The initialisation stage involves an 8 byte secret key and a 256 byte 8 bit substitution cipher in the form of a numerical array. Firstly the array is initialised by the following routine:

For i=0 to 255
  cipher [i]=i
next

This ensures that all possible 8 bit numbers are present in the array in a monotonic increasing sequence. The elements of the array are now jumbled up by swapping pairs using the secret key to determine which pairs are swapped. Basically the following swapping scheme is used;

For j = 0 to 255    (all elements)
  cipher [j]  −  cipher [rnd (j,255)]
next

Where a(j)-a(k) means swap contents of a(j) and a(k)
Where rnd(x,y) means generating any integer with equal probability in the range x-y In one embodiment of the invention the 8 byte secret key is used 2 bytes at a time to produce the random seed as follows. The random seed is a 32 bit, i.e. 4 byte number and its top 2 bytes (most significant) are set to the first two chosen bytes of the key. The bottom 2 bytes (least significant) of the seed are set to the two most significant bytes of the last random number produced. The random number seed is always initialised to 0 at the very beginning of the algorithm. A suitable random number generator is applied to this seed, the exact details of which are not important to the invention but basically involve a numerical function of the random seed. The random number produced is applied to the mixing scheme above to mix two elements. This is repeated for each of the 256 values of J.

After one complete pass has been made through all elements of the cipher the next two bytes of the secret key are used to produce another random seed and a further pass is made through the cipher. Similar passes are made with the third and fourth group of two bytes of the random key such that at the end of the process four passes have been made through the cipher serving to mix up the element values within the cipher in a manner which can only controllably be achieved by using the known secret key. The advantage of using the above method is that all the bytes of the key may be the same yet produce different initial random seeds during each pass in mixing all the elements of the cipher. The number of permutations possible with such a cipher is equal to the factorial of the number of elements. Hence in this example it is 256, which is a vastly bigger number than with the maximum $2^{64}$ permutations of an 8 byte key. Thus a good cipher distribution is obtained.

In use, the initialisation described above is performed once by the transmitting or host processor when given the secret key. It can then destroy the secret key and hold the cipher in a secure part of its memory. At this stage the cipher is effectively the key and thus its security should be maintained.

The receiving or slave processor, for example an electronic token or smart card, is also, during the initialisation stage, sent the derived cipher by means of a secure communication link and stores the same cipher again in a secure part of its memory. The card or processor can be adapted to destroy the cipher if it is compromised.

Since the secret key is an 8 byte key there are $2^{64}$ possible unique keys, any one of which can be used.

The cipher derived as above is then used in a working stage to provide an authenticator for a message. One form of the algorithm produced is shown in FIG. 1 which shows an algorithm adapted to provide an authenticator for a message of n bytes.

The algorithm shown in FIG. 1 is designed for an 8 bit processing system and in general will operate on any message, although the preferred size range is from 12 to 256 bytes. A message length of less than 12 bytes could compromise the security of such a system and a message length of greater than 256 bytes is harder to achieve on an 8 bit processing system and requires a great deal of processing. If a message of greater than 256 bytes is required to be sent it is often preferable to split the message into 256 byte blocks and add an authenticator to each block. This also makes it easier to retransmit any block which is compromised, rather than having to retransmit the whole message.

The algorithm includes an 8 byte working register W(P) from which the final authenticator is derived. In order for it to work the whole message or block must be present and its length n known. The algorithm of FIG. 1 is then applied to the message. In the figure the following terms are used.

S [ ] = substitution cipher [ ]

P is a pointer for working register W( ) and so has range 0–7

A = an 8 bit value used for storing results between operations.

Mi = ith Message byte from beginning of message.

Mn+1−i = ith Message byte from end of message.

n = message length $+_2$ = Modulo 2 addition (Exclusive—Or)

$+_{256}$ = Modulo 256 addition $C_1$ = Carry from 1st $+_{256}$ operation in preceding line $C_2$ = Carry from 2nd $+_{256}$ operation in preceding line The working of the algorithm is self explanatory from the figure and basically uses elements of the substitution cipher, previously mixed up by means of the chosen secret key, to derive each of the 8 bytes of the working register W(P). The 8 derived bytes are then combined in the following form to produce a 4 byte authenticator A(0)–A(3) where;

$$A(0) = W(0) +_2 W(2)$$

$$A(1) = W(1) +_2 W(3)$$

$$A(2) = W(4) +_2 W(6)$$

$$A(3) = W(5) +_2 W(7)$$

A 4 byte authenticator means that there is a $1:2^{32}$ chance of the same authenticator being derived by a different message or, by chance, by an unauthorised user.

The actual message is left intact after this processing and is subsequently transmitted together with the 4 bytes of the authenticator. Alternatively, the authenticator could be sent on its own without the message if, for instance, the message has been previously sent to the current transmitter in order to verify the transmitters identity. At the receiving end the receiving or slave processor uses an identical authenticator algorithm on the message received to produce his own authenticator. If the received and derived authenticators are the same then the user can be reasonably sure that security has not been compromised.

The authenticator described above can protect messages between two users from 2 possible attacks: (1) Alteration of the message, and (2) A new message being created which is not derived from one of the users. However, two further types of attack may be made to a system, these being (3) Incorrect routing, either accidentally or deliberately, of a message to the wrong receiver, and (4) The replay of old messages as if they were new ones.

In order to protect messages from the latter two types of attack the validation procedure shown in FIGS. two and three can be utilised, in which a header is added to a message, which header contains four elements - The receivers ID or identity code, the senders ID code, a senders message number and a receivers message number. The message number must be unique to that message and not repeated for a long time, Examples are a date and time code, a monotonic increasing number sequence or a pseudo random sequence. The former is difficult to implement on a smart card system so that one of the latter is usually chosen.

An initialisation stage of the validation procedure involves three messages being interchanged. Firstly, user A sends to user B a header comprising the senders ID and the senders message number; and an authenticator for the header. User B checks the authentication is correct and user A's I.D. and, if so, stores the user A's I.D. and message number. User B then sends a return header comprising user A's I.D., user B's I.D., user A's message number (previously stored) and user B's message number, together with an authenticator based on this header. The authenticator, both I.D.'s and user A's message number are checked by the initial sender (user A) and the header information stored. Lastly, another header is sent from A to B comprising both I.D. codes, B's message number and A's message number, the latter incremented by one in the monotonic or pseudo random sequence, together with a new authenticator based on this header. The receiver checks the authenticator and header and if all is well transferal of proper messages begins. If at any stage in the initialisation procedure an authenticator is not correct or an incorrect I.D. code is present or an incorrect message number is present the process is terminated.

Transferral of messages then takes place as shown in FIGS. two and three. A sender generates the four components of a header 1 (two device I.D.'s and two message numbers) and generates an authenticator based on the combined header and message 2, using a secret key 4. The receiver applies his secret key to the received message and derives a reference authenticator. The two authenticators can then be compared. If correct, he checks the senders and receivers I.D.'s and the message numbers. If all are correct then the message is read and acted on. If at any stage something is wrong then the process is terminated.

I claim:

1. In an electronic transaction system, comprising: a host computer including means for generating an authentication code for a digital signal message wherein the authentication code is to be appended to the message without altering the digital signal constituting the message; a reading device connected to the host computer; and a portable token having memory storage means, micro-controller means and means for data transmission and reception, the micro-controller also having means for generating the authentication code; the host computer and the micro-controller communicating so as to pass digital signal messages therebetween; wherein the authentication code is generated according to a method comprising:

generating, in at least the host computer, a numerical array; using in at least the host computer a key to controllably shift the relative positions of each element within the array to form a scrambled array; and applying the scrambled array to the message to provide an authentication code for that message, in the host computer and the micro-controller.

2. A method as claimed in claim 1, wherein said using step includes using the key to generate a first pseudo-random seed and using the seed to generate a number for each individual element of the numerical array which number determines the position of a second element of the array which is swapped with that element.

3. A method as claimed in claim 2, wherein said using step includes generating one number consecutively for each different array element in turn, each number being generated by applying a pseudo-random function to a previously generated number.

4. A method as claimed in claim 2, wherein said using step includes generating, after the first pseudo-random seed has been used to shift the relative positions of all the elements of the array, at least one further pseudo-random seed from the key and using the at least one further seed to further shift the relative positions of the array elements.

5. A method as claimed in any of claim 2, wherein the key comprises a plurality of bytes, and further including using chosen groups of these bytes to generate said pseudo-random seed.

6. A method as claimed in claim 1, including dividing the message into segments of a chosen length; and deriving a separate authentication code, considerably shorter than the segment, for each segment.

7. A method as claimed in claim 1 wherein said applying step includes applying the scrambled array to the message in a plurality of steps, each using chosen operators on chosen array elements and chosen message bytes to derive a value for each of a plurality of register elements of a working register; and combining the working register elements to form the authenticator.

8. A method as claimed in claim 7, including using sufficient steps so that every message byte is used at least once to derive the authenticator.

9. A method as claimed in claim 7, including using message bytes in each step in multiples of at least two.

10. A method as claimed in claim 7, including using operators which are any combination of $+_2$ and $+_{256}$ operation and carry operators.

11. A method for electronic transaction, comprising: generating an authentication code according to the method of claim 1; appending the code to a message; transmitting the message; separating, at a receiver, the message from the code; using said method on the received message to generate a second authentication code and comparing the received code with that generated at the receiver.

12. A method as defined in claim 1, including providing the reading device as an inductive reading device and providing the portable token with means for data transmission and reception by inductive coupling such that the micro-controller and the host computer communicate by inductive coupling.

* * * * *